(12) United States Patent
Engelsiepen

(10) Patent No.: US 6,460,911 B1
(45) Date of Patent: Oct. 8, 2002

(54) DITCH SCOOPING DEVICE

(76) Inventor: Raymond C. Engelsiepen, 2414 Arthursville Rd., Hartly, DE (US) 19953

( * ) Notice: Subject to any disclaimer, the term of this patent is extended or adjusted under 35 U.S.C. 154(b) by 0 days.

(21) Appl. No.: 09/838,833

(22) Filed: Apr. 20, 2001

(51) Int. Cl.[7] ................................................. A01B 1/02
(52) U.S. Cl. ............................ 294/49; 294/55; 294/58
(58) Field of Search ........................... 294/9, 49, 50, 294/50.7, 55, 57, 58; 16/110.1, 422, 426; 172/13, 19, 371, 377, 381

(56) References Cited

U.S. PATENT DOCUMENTS

| | | | | |
|---|---|---|---|---|
| 237,891 A | * | 2/1881 | Musselman | 294/58 X |
| 519,515 A | * | 5/1894 | Walsh | 294/58 |
| 1,529,835 A | * | 3/1925 | Hamilton | 294/57 |
| 2,068,046 A | * | 1/1937 | Yardlay | 294/55 |
| 2,299,418 A | | 10/1942 | Thomas | |
| 2,495,802 A | * | 1/1950 | Anderson | 294/55 |
| 2,618,501 A | | 11/1952 | Tallant | |
| 4,690,447 A | * | 9/1987 | Adams | 294/58 X |
| 4,767,141 A | * | 8/1988 | Martin | 294/58 X |
| 4,794,667 A | * | 1/1989 | Nelson et al. | 294/58 X |
| 4,848,818 A | | 7/1989 | Smith | |
| 5,209,534 A | * | 5/1993 | Crenshaw et al. | 294/49 X |
| D374,319 S | | 10/1996 | Schildgen | |
| 5,660,421 A | | 8/1997 | Krenzler | |
| 5,791,708 A | | 8/1998 | Capriotti | |

* cited by examiner

Primary Examiner—Johnny D. Cherry

(57) ABSTRACT

A ditch scooping device for removing loose dirt from deep, narrow trenches. The ditch scooping device includes an elongate shaft having a top end and a bottom end; and also includes a particle pickup member being removably attached to the bottom end of the elongate shaft; and further includes handle members being attached to the elongate shaft.

5 Claims, 2 Drawing Sheets

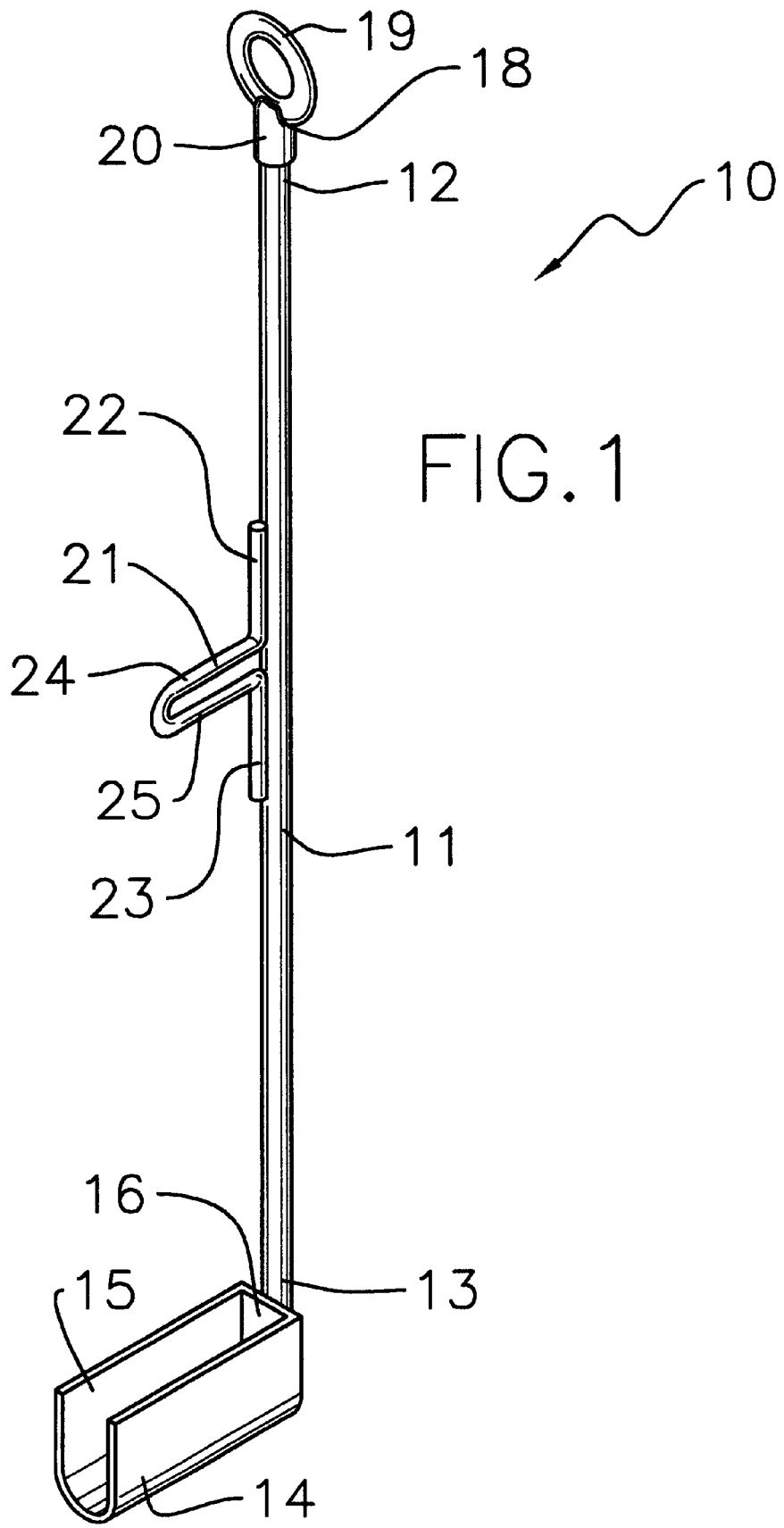

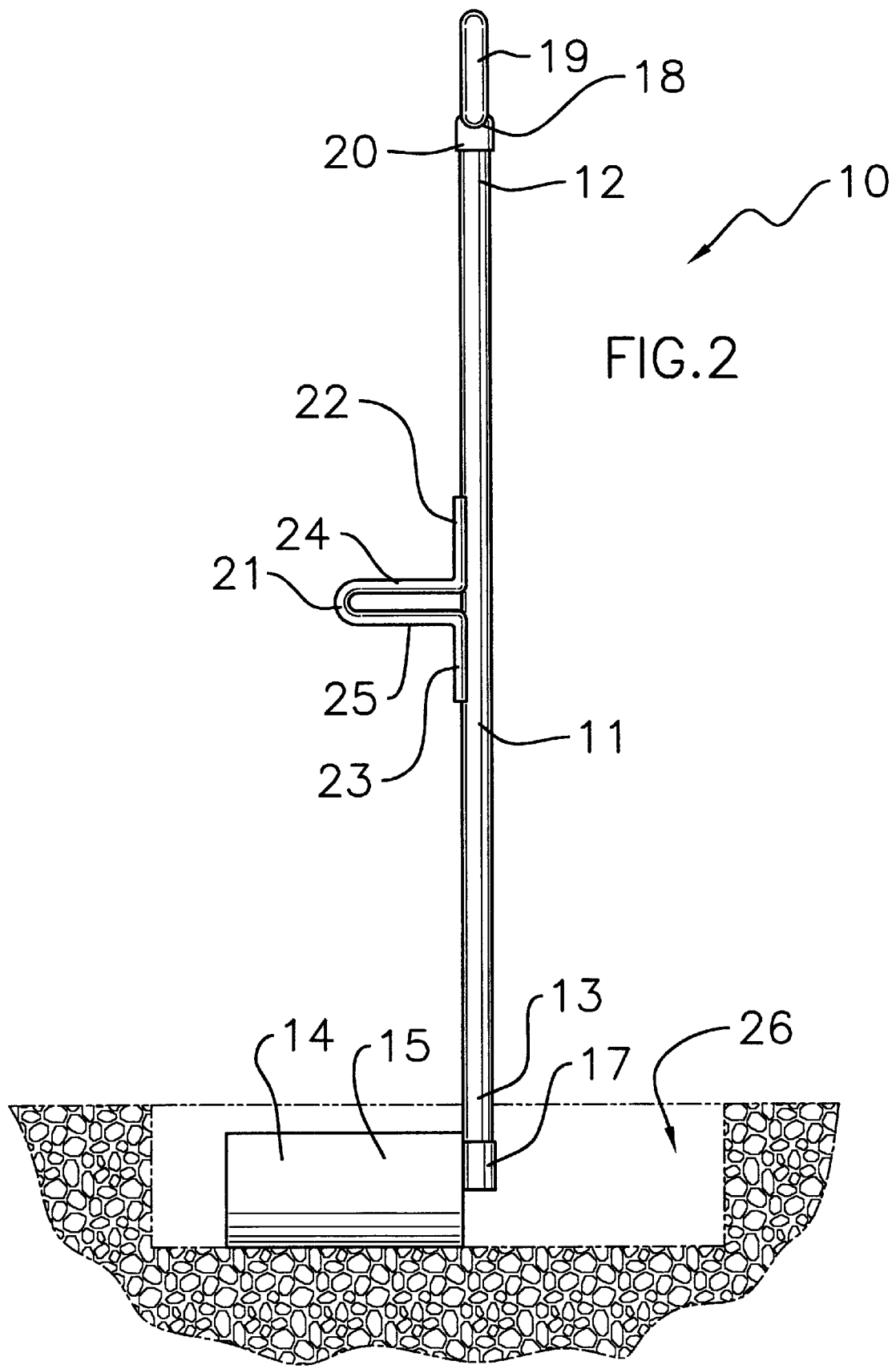

DITCH SCOOPING DEVICE

BACKGROUND OF THE INVENTION

1. Field of the Invention

The present invention relates to particle scooping devices and more particularly pertains to a new ditch scooping device for removing loose dirt from deep, narrow trenches.

2. Description of the Prior Art

The use of particle scooping devices is known in the prior art. More specifically, particle scooping devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,618,501; U.S. Pat. No. 5,791,708; U.S. Pat. No. 2,299,418; U.S. Pat. No. 4,848,818; U.S. Pat. No. 5,660,421; and U.S. Pat. No. Des. 374,319.

While these devices fulfill their respective, particular objectives and requirements, the aforementioned patents do not disclose a new ditch scooping device. The inventive device includes an elongate shaft having a top end and a bottom end; and also includes a particle pickup member being removably attached to the bottom end of the elongate shaft; and further includes handle members being attached to the elongate shaft.

In these respects, the ditch scooping device according to the present invention substantially departs from the conventional concepts and designs of the prior art, and in so doing provides an apparatus primarily developed for the purpose of removing loose dirt from deep, narrow trenches.

SUMMARY OF THE INVENTION

In view of the foregoing disadvantages inherent in the known types of particle scooping devices now present in the prior art, the present invention provides a new ditch scooping device construction wherein the same can be utilized for removing loose dirt from deep, narrow trenches.

The general purpose of the present invention, which will be described subsequently in greater detail, is to provide a new ditch scooping device which has many of the advantages of the particle scooping devices mentioned heretofore and many novel features that result in a new ditch scooping device which is not anticipated, rendered obvious, suggested, or even implied by any of the prior art particle scooping devices, either alone or in any combination thereof.

To attain this, the present invention generally comprises an elongate shaft having a top end and a bottom end; and also includes a particle pickup member being removably attached to the bottom end of the elongate shaft; and further includes handle members being attached to the elongate shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ditch scooping device which has many of the advantages of the particle scooping devices mentioned heretofore and many novel features that result in a new ditch scooping device which is not anticipated, rendered obvious, suggested, or even implied by any of the prior art particle scooping devices, either alone or in any combination thereof.

It is another object of the present invention to provide a new ditch scooping device which may be easily and efficiently manufactured and marketed.

It is a further object of the present invention to provide a new ditch scooping device which is of a durable and reliable construction.

An even further object of the present invention is to provide a new ditch scooping device which is susceptible of a low cost of manufacture with regard to both materials and labor, and which accordingly is then susceptible of low prices of sale to the consuming public, thereby making such ditch scooping device economically available to the buying public.

Still yet another object of the present invention is to provide a new ditch scooping device which provides in the apparatuses and methods of the prior art some of the advantages thereof, while simultaneously overcoming some of the disadvantages normally associated therewith.

Still another object of the present invention is to provide a new ditch scooping device for removing loose dirt from deep, narrow trenches.

Yet another object of the present invention is to provide a new ditch scooping device which includes an elongate shaft having a top end and a bottom end; and also includes a particle pickup member being removably attached to the bottom end of the elongate shaft; and further includes handle members being attached to the elongate shaft.

Still yet another object of the present invention is to provide a new ditch scooping device that is easy and convenient to use.

Even still another object of the present invention is to provide a new ditch scooping device that saves the user substantial time in removing dirt from trenches.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new ditch scooping device according to the present invention.

FIG. 2 is a side elevational view of the present invention shown in use.

DESCRIPTION OF THE PREFERRED EMBODIMENT

With reference now to the drawings, and in particular to FIGS. 1 through 2 thereof, a new ditch scooping device embodying the principles and concepts of the present invention and generally designated by the reference numeral 10 will be described.

As best illustrated in FIGS. 1 through 2, the ditch scooping device 10 generally comprises an elongate shaft 11 having a top end 12 and a bottom end 13 with the elongate shaft 11 having a length of approximately 54½ inches. A particle pickup member 14 is removably attached to the bottom end 13 of the elongate shaft 11. The particle pickup member 14 has a laterally-curved plate 15 which has an open front end and a closed back end which is formed with a wall 16 being securely and conventionally attached to the laterally-curved plate 15. The particle pickup member 14 further has a grommet 17 being securely and conventionally attached to the wall 16 and being disposed outside of the laterally-curved plate 15. The grommet 17 removably and engagably receives the bottom end 13 of the elongate shaft 11. The particle pickup member 14 has a length of approximately 9 inches.

Handle members 18,21 are conventionally attached to the elongate shaft 11. The handle members 18,21 include a first handle member 18 being attached to the top end 12 of the elongate shaft 11 and also includes a second handle member 21 being attached to the elongate shaft 11 intermediate of the top and bottom ends 12,13. The first handle member 18 includes a ring portion 19 and a tubular portion 20 extending from the ring portion 19 and having an open end. The tubular portion 20 engagably receives the top end 12 of the elongate shaft 11. The second handle member 21 includes end portions 22,23 which are securely and conventionally attached to the elongate shaft 11, and also includes intermediate portions 24,25 which are angled relative to the end portions 22,23 and which are spacedly curved back upon one another. The intermediate portions 24,25 extend outwardly generally perpendicular to the elongate shaft 11.

In use, the user places the particle pickup member 14 in a trench 26, and moves the particle pickup member 14 along in the trench 26 with the laterally-curved plate 15 picking up the dirt therein. As the laterally-curved plate 15 fills up with dirt, the user removes it and empties the laterally-curved plate 15.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ditch scooping device comprising:

an elongate shaft having a top end and a bottom end;

a particle pickup member for gathering particles from a trench being removably attachable to said bottom end of said elongate shaft;

said pickup member having an arcuate bottom portion and a pair of side walls extending away from said bottom portion in a substantially parallel manner such that said pickup member has a substantially U-shaped cross section as taken perpendicular to a longitudinal axis of said pickup member;

said pickup member having a wall mounted on a trailing end of said pickup member such that said trailing end is closed and a leading end of said pickup member is open;

wherein a top of said pickup member is substantially open along a full length of said pickup member to facilitate the gathering of the particles in the trench;

a grommet being securely attached to said wall and being disposed outside of said particle pickup member, said grommet removably receiving said bottom end of said elongate shaft;

wherein a central axis of said grommet is oriented substantially perpendicular to the longitudinal axis of said pickup member; and handle members being attached to said elongate shaft.

2. A ditch scooping device as described in claim 1, wherein said handle members includes a first handle member being attached to said top end of said elongate shaft and also includes a second handle member being attached to said elongate shaft intermediate of said top and bottom ends.

3. A ditch scooping device as described in claim 2, wherein said first handle member includes a ring portion and a tubular portion extending from said ring portion and having an open end, said tubular portion engagably receiving said top end of said elongate shaft.

4. A ditch scooping device as described in claim 2, wherein said second handle member includes end portions which are securely attached to said elongate shaft, and also includes intermediate portions which are angled relative to said end portions and which are spacedly curved back upon one another, said intermediate portions extending outwardly generally perpendicular to said elongate shaft.

5. A ditch scooping device comprising:

an elongate shaft having a top end and a bottom end, said elongate shaft having a length of approximately 54½ inches;

a particle pickup member being removably attached to said bottom end of said elongate shaft, said particle pickup member having a laterally-curved plate which has an open front end and a closed back end which is formed with a wall being securely attached to said laterally-curved plate, said particle pickup member further having a grommet being securely attached to said wall and being disposed outside of said laterally-curved plate, said grommet removably receiving said bottom end of said elongate shaft, said particle pickup member having a length of approximately 9 inches; and handle members being attached to said elongate shaft, said handle members including a first handle member being attached to said top end of said elongate shaft and also including a second handle member being attached to said elongate shaft intermediate of said top and bottom ends, said first handle member including a ring portion and a tubular portion extending from said ring portion and having an open end, said tubular portion engagably receiving said top end of said elongate shaft, said second handle member including end portions which are securely attached to said elongate shaft, and also including intermediate portions which are angled relative to said end portions and which are spacedly curved back upon one another, said intermediate portions extending outwardly generally perpendicular to said elongate shaft.

\* \* \* \* \*